J. J. COWELL.
Trunk-Fasteners.
No. 158,041. Patented Dec. 22, 1874.
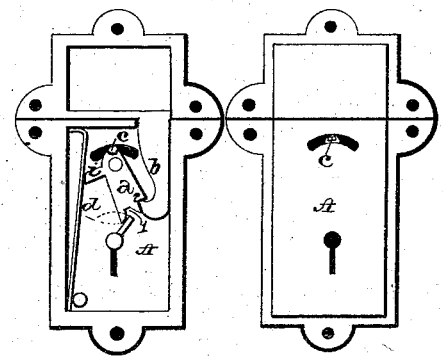
WITNESSES.
J Wm Larner
J. F. Lehmann
INVENTOR.
John J. Cowell
per
Oliver Drake, Atty

UNITED STATES PATENT OFFICE.

JOHN J. COWELL, OF NEWARK, NEW JERSEY.

IMPROVEMENT IN TRUNK-FASTENERS.

Specification forming part of Letters Patent No. 158,041, dated December 22, 1874; application filed September 10, 1874.

CASE E.

*To all whom it may concern:*

Be it known that I, JOHN J. COWELL, of the city of Newark, in the county of Essex and State of New Jersey, have invented certain new and useful Improvements in Trunks; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to an improvement in locks or catches for trunks; and it consists in the novel arrangement and combination of parts, which will be more fully described hereafter and claimed.

The accompanying drawing represents my invention.

$a$ represents a catch, which is pivoted at its upper end to the inside of the lock-frame A, and which has a notch, 1, formed in its lower end to receive the key by which it is to be operated, and a notch or shoulder, 2, under which the hook $b$ catches. This catch being pivoted at its upper end, and held in an inclined position by a flat or coiled spring, $d$, which bears against an arm or extension, $i$, formed on the side of the catch, the greater the upward strain upon the hook or catch $b$ the tighter does the catch hold it. Upon the front face of the catch is formed a stud or projection, $c$, which projects outward through a curved slot in the frame A, so that by moving this stud with the fingers the catch is operated so as to lock or unlock the hook or catch $b$ at will. Either this stud alone or a key may be used to lock or unlock the trunk.

It will be observed that, if the arm on the catch $a$ is thrown past the center or "dead-point" either way, it is held by the spring $d$, locked or unlocked, as the case may be.

If the catch $a$ were pivoted below its point of contact with the bolt, it would be more liable to unlock itself, as the draft would be from the center, and hence would not be so effectual.

I am aware that a catch somewhat similar to mine is shown in the patent to J. Heiser, May 26, 1874, and this I disclaim. In this case, however, the bolt is pivoted at its lower end instead of above the center, is slotted so as to be vertically adjustable, and requires a separate device to hold it.

Having thus described my invention, I claim—

The frame A and hook $b$, in combination with the catch $a$, having the notches 1 2 in its lower end, arm $i$, spring $d$, slot and stud $c$, the catch being pivoted at its upper end, substantially as shown and described.

In testimony that I claim the foregoing as my own invention I affix hereto my signature in presence of two witnesses.

JOHN J. COWELL.

Witnesses:
  GEO. H. WILSON,
  ANDREW D. CODY.